(12) United States Patent
Sawada et al.

(10) Patent No.: US 6,219,381 B1
(45) Date of Patent: Apr. 17, 2001

(54) IMAGE PROCESSING APPARATUS AND METHOD FOR REALIZING TRICK PLAY

(75) Inventors: Takaaki Sawada; Yoichiro Takeuchi, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/082,793

(22) Filed: May 22, 1998

(30) Foreign Application Priority Data

May 26, 1997 (JP) .................................................. 9-134903
Jun. 5, 1997 (JP) .................................................. 9-147846

(51) Int. Cl.[7] .................................................. H04N 7/12
(52) U.S. Cl. .................................................. 375/240.14
(58) Field of Search .................................. 348/390, 398, 348/409, 385, 419

(56) References Cited

U.S. PATENT DOCUMENTS 5,956,088 * 9/1999 Shen et al. ............................. 348/390
5,956,741 * 9/1999 Jones ..................................... 348/398

* cited by examiner

*Primary Examiner*—Chris Kelley
*Assistant Examiner*—Allen Wong
(74) *Attorney, Agent, or Firm*—Finnegan, Henderson, Farabow, Garrett, & Dunner, L.L.P.

(57) ABSTRACT

A computer system for sending out and reproducing at a fixed rate a moving picture file encoded by a moving picture compression scheme using interframe prediction is disclosed. In producing a file for rapid feed or reverse rapid feed from the moving picture file, I-pictures are extracted sequentially from the head of the moving picture file for rapid feed and from the trailing end of the moving picture file for reverse rapid feed thereby to reduce the information by the I-pictures. Digits 0s are padded in place of the I-pictures thus reduced and a designated bit rate for reproduction is stored in the header of the picture file, thereby producing a moving picture file for trick play.

19 Claims, 15 Drawing Sheets

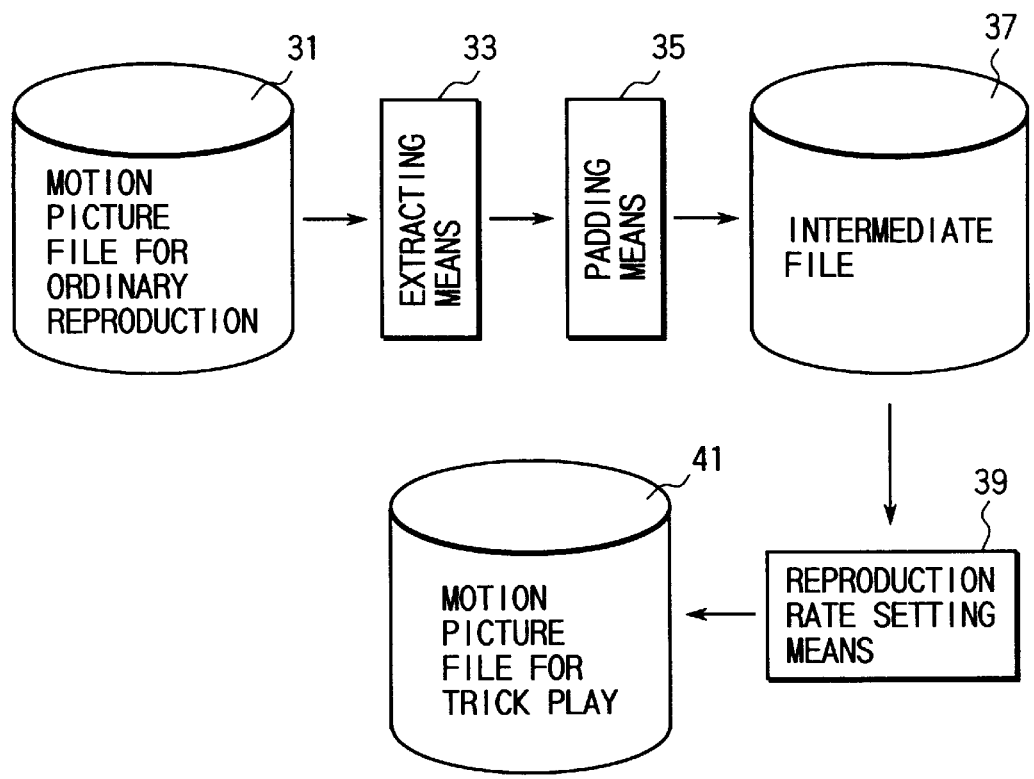
FIG. 5
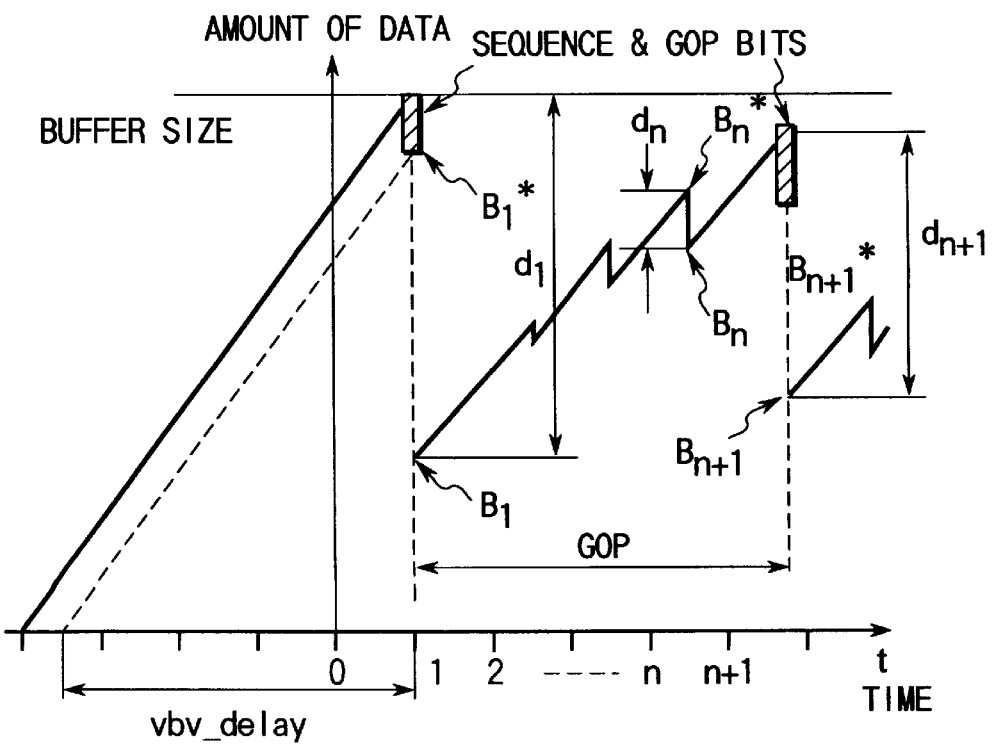
FIG. 6    VBV BUFFER OCCUPANCY

HIERARCHICAL ARRANGEMENT
OF MPEG2 IMAGE DATA

IMAGE PROCESSING APPARATUS AND METHOD FOR REALIZING TRICK PLAY

BACKGROUND OF THE INVENTION

The entire contents of Japanese Patent Application No. 9-134903 filed on May 26, 1997 and Japanese Patent Application No. 9-147846 filed on Jun. 5, 1997 are incorporated herein by reference.

The present invention relates to an image processing apparatus and method in which the moving picture data encoded by compressing moving pictures using the interframe prediction are sent out and reproduced at a fixed rate, and more particularly to an image processing apparatus and method for realizing what is called a trick play such as rapid feed and reverse rapid feed.

The current mainstream of the technique for encoding moving pictures by a compression scheme using the interframe prediction includes the MPEG2 (Moving Picture Experts Group) international standards. Normally, in a moving picture processing system with MPEG2, as shown in FIG. 1, the moving picture data recorded in a video tape 1 or the like or the real-time moving picture data obtained by use of a video camera 3 or the like are encoded by a dedicated encoder system 5 and stored in an external memory as a moving picture file 7. The moving picture file 7 thus stored is decoded by a dedicated decoder system 9 and reproduced for display on a TV 11 or the like. In this case, there are two techniques for sending the data from the moving picture file 7 to the decoder system 9, a fixed rate and a variable rate. The following two conventional methods are used for realizing the trick play (rapid feed, reverse rapid feed, etc.) with a MPEG2 system.

In the first method, the moving picture data for trick play is prepared in tape or the like beforehand and encoded by an encoder to produce a MPEG2 trick play moving picture file. This method, however, poses the problem that considerable labor and time are required to produce the moving picture data for trick play in advance and to encode it to MPEG2 image data.

In the second method, a moving picture file for ordinary reproduction which is encoded by a MPEG2 encoder is used for trick play reproduction at the time of decoding. As shown in FIG. 2, for example, when decoding the moving picture file 13 for ordinary play, only the intraframe coded pictures (I-pictures) or only the intraframe coded picture and the interframe forward predictive pictures (P-pictures) are decoded out of the frame information sent out to a MPEG2 decoder system 15 and displayed on a TV 17 for realizing the rapid feed.

For realizing a normal rapid feed when data are sent out at a fixed rate by this method, however, a complex process is required for image data search and buffer management at the time of decoding. Also, some decoders based on MPEG2 currently in use have no such a special function and therefore this method is not usable in all cases.

BRIEF SUMMARY OF THE INVENTION

The object of the present invention is to provide an image processing apparatus and method in which the normally-reproducible moving picture data encoded by compression using the interframe prediction are sent out and reproduced at a fixed rate, thereby producing the moving picture data capable of realizing a trick play properly.

According to a first aspect of the invention, there a video server system supplying video data to a client system through a network in response to a request from an end user, comprises a disk array for storing video data, and a video server including: means for reading the video data stored in the disk array; means for extracting the intraframe coded image data alone sequentially from the head of the video data thus read; means for reducing the information in the intraframe encoded image data extracted; padding means for inserting a padding code in each intraframe encoded image data in such a manner that the intraframe encoded image data in which the information is reduced satisfies a designated bit rate for reproduction; means for setting the designated bit rate for reproduction in the header of the moving picture data; and means for producing buffer control information and setting the information in each frame header of the video data in such a manner as to assure proper start of reproduction and proper random access in reproducing the video data containing the padding code.

According to a second aspect of the invention, an image processing method for a video server system supplying video data to a client system through a network in response to a request from an end user, comprising the steps of: extracting the information from the intraframe coded image data alone sequentially from the head of the video data; reducing the information in the intraframe coded image data extracted; inserting a padding coded in each intraframe coded image data in such a manner that the intraframe coded image data in which the information is reduced satisfies the designated bit rate for reproduction; and setting the designated bit rate for reproduction in the header of the moving picture data.

According to a third aspect of the invention, an image processing apparatus for sending out at a fixed rate the moving picture data encoded by compression using the interframe prediction, comprising: means for extracting only the intraframe coded image data sequentially from the head of the moving picture data; means for reducing the information in the intraframe coded image data extracted; padding means for inserting a padding code in each intraframe coded image data in such a manner that the intraframe coded image data in which the information is reduced satisfies the designated bit rate for reproduction; and reproduction rate setting means for setting a designated bit rate for reproduction in the header of the moving picture data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 5 is a block diagram showing an image processing apparatus according to a first embodiment of the invention;

FIG. 6 is a diagram showing the relation between the decoding process and the amount of data in an output buffer;

DETAILED DESCRIPTION OF THE INVENTION

Figure 3:
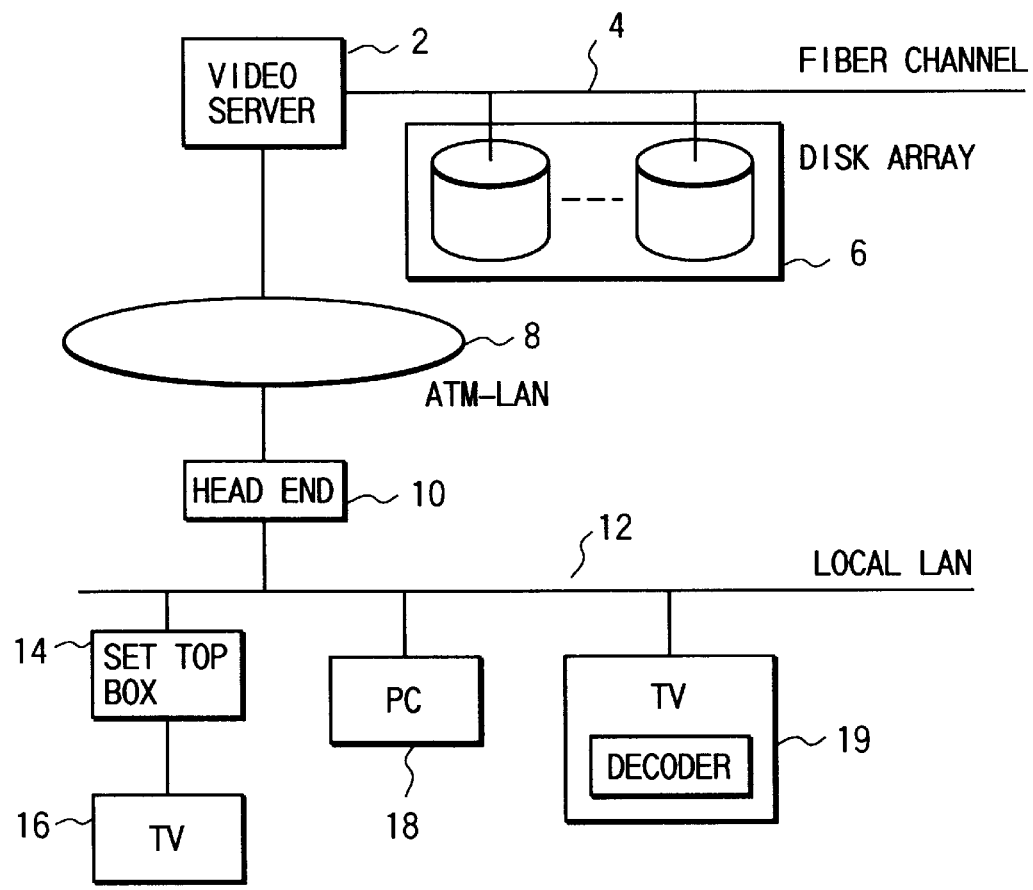
FIG. 3 is a system block diagram showing an example of the video server system using an image processing apparatus and an image processing method for realizing a trick play according to the invention.

An embodiment of the invention will be explained below with reference to the accompanying drawings. FIG. 3 is a system block diagram showing a video server system for realizing an image processing apparatus and an image processing method for realizing a trick play according to the invention. In FIG. 3, the video server system comprises a video server 2 for producing a trick play file and distributing video data. The video server 2 is connected through a fiber channel 4 to a disk array 6. The disk array 6 is configured of, for example, a RAID 5 (Redundant Array of Inexpensive Disks) for storing the video data to be distributed. The video server 2 reads the image data or the trick play image data from the image file or the trick play file, respectively, stored in the disk array 6, and sends them through an ATM-LAN (Asynchronous Transfer Mode-Local Area Network) 8 to a head-end (HE) remodulator (frequency changer) 10. The head-end remodulator 10 includes a modulator, a pilot signal (reference test signal) generator, a scramble encoder (for mixing signals according to a predetermined rule) and a signal synthesizer. The video signal received from the video server is processed by each unit described above and distributed to the client. Specifically, the client unit is configured of various terminals connected through a LAN 12 to the head-end remodulator 10 for receiving the video signal. These terminals are, for example, a set-top box (transceiver terminal installed on a TV set or the like) 14 and a TV receiver 16 connected with each other, a personal computer 18 having the function of receiving a TV signal or a TV receiver 19 having built therein a decoder for decoding the TV signal.

Figure 4:
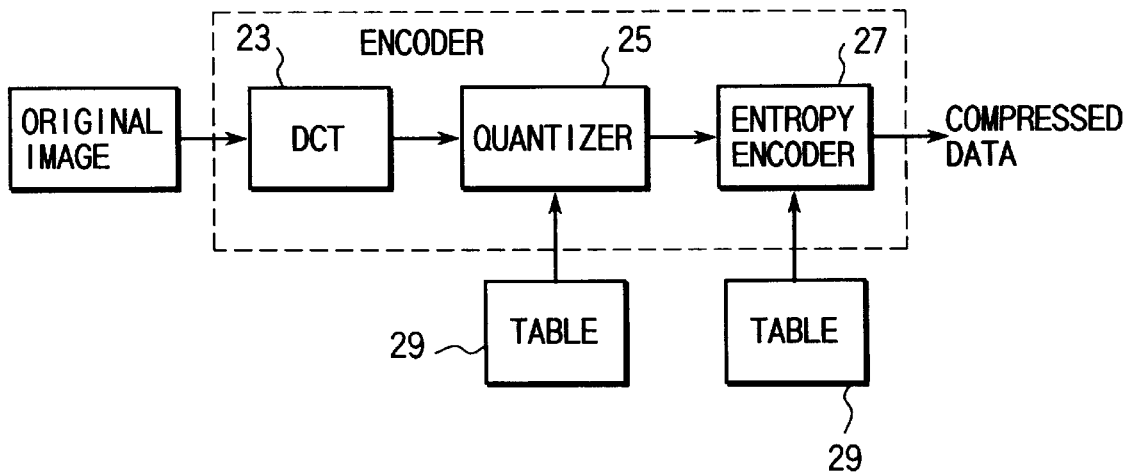
FIG. 4 is a diagram showing the principle of image compression according to MPEG2.

In image compression according to MPEG2, the image data are subjected to DCT (discrete cosine transform) for quantization. Specifically, as shown in FIG. 4, an input image (original image) 21 first is divided into blocks of 8×8 pixels. For each block, the DCT calculation is carried out by a DCT circuit 23, and the DCT coefficients thus obtained are quantized by a quantization circuit 25 for the DC component and the AC component independently of each other. A quantization table 29 used for quantization includes a luminance signal quantization table and a color difference signal quantization table. Of the DCT coefficients quantized, the DC component is encoded by an entropy encoding circuit 27 for encoding a difference with the DC component of the immediately preceding block as a predicted value. The remaining AC component is rearranged by zig-zag scan within the block and encoded by the circuit 27. As a result of the DCT described above, the pixel value (such as the luminance) distributed at random before transformation is concentrated as a large value on the low-frequency term after DCT. It is therefore possible to compress the image data by performing the operation of eliminating (removing) the high-frequency terms.

FIG. 5 shows an image processing apparatus according to a first embodiment of the invention. In this embodiment, the moving picture data in the file 31 for ordinary reproduction encoded by the encoder based on MPEG2 are processed by use of extracting means 33, padding means 35 and reproduction rate setting means 39.

The extracting means 33 is for extracting only the I-pictures (intraframe coded image data) sequentially from the head of the moving picture data. The padding means 35 is for inserting a padding code in each I-picture so as to secure the same size as the maximum one of the I-pictures extracted by the extracting means 33. Further, the reproduction rate setting means 39 is for determining a reproduction rate in such a manner as not to cause any overflow or underflow of a buffer at the time of decoding and reproducing the moving picture data output from the padding means 35, and setting the reproduction rate in the header of the particular moving picture data.

Now, an explanation will be given of the operation of the image processing apparatus configured as described above. The extracting means 33 extracts only the I-pictures sequentially from the head of the moving picture data contained in the file 31 for ordinary reproduction. The extracting means 33 thus outputs only the I-pictures sequentially from the head of the moving picture data. The padding means 35 inserts a padding code in each I-picture in order to secure same size as the maximum one of all the I-pictures extracted by the extracting means 33 and produces an intermediate file 37.

The reason why the padding code is inserted in the I-pictures extracted will be explained. The moving picture data in the file 31 for ordinary reproduction is such that the total picture size is substantially the same for each GOP (between one I-picture and another) at the time of encoding. This is in order to prevent an overflow or an underflow in the buffer held at the image output for the decoding process. The relation between the decoding process and the data amount in the output buffer is shown in FIG. 6 in which the ordinate represents the data amount in the buffer and the abscissa represents time. Specifically, as shown in FIG. 6, the pictures are decoded at a predetermined time interval t. In the case where the total picture size is substantially the same for each GOP, therefore, it is seen that the data amount in the buffer tends to be stable, as described below in detail.

The bit stream encoded at a predetermined rate is required to meet the requirements inserted through a video buffering verifier (VBV). The VBV is a virtual decoder conceptually connected to the output of the encoder. The encoded data are retrieved from the buffer. The encoder is required to generate a bit stream in such a manner as not to cause any overflow or underflow of the VBV input buffer.

The VBV and the video encoder have the same clock frequency and the same picture rate and operate in synchronism with each other. The VBV includes an input buffer of size B which is given by a vbv_buffer_size field of a sequence header.

The VBV input buffer is initially vacant. After the first picture start code and all the data preceding to the first picture start code are stored in the input buffer, the bit stream is stored in the input buffer for a time length defined by the vbv_delay field of the video bit stream. All the image data of the image that has been held longest in the particular buffer are removed instantaneously. Then, after each picture interval, the image data of the image that has been held longest as of the particular time point is removed instantaneously. As a result, the associated picture data include the sequence header immediately preceding to the picture start code, the GOP layer data, the picture data element and the trailing stuffing bit or byte. In the case of the picture first encoded in the video sequence, the picture data contains the "0" stuffing bit or stuffing byte immediately before the sequence header.

The VBV buffer is checked immediately before and after retrieval of the picture data. Each time the VBV buffer is checked, the capacity of the particular buffer is required to be between zero bit and B bits. In this case, character B represents the size of the VBV buffer designated by vbv_buffer_size in the sequence header. These are the requirements for the beam stream as a whole. In order to meet these requirements, the (n+1)th coded image $d_{n+1}$ is required to satisfy the following equation (1).

$$d_{n+1} > B_n + (2R/P) - B$$
$$d_{n+1} \leq B_n + (R/P). \tag{1}$$

where $n \geq 0$,
B: a VBV receive buffer size given as vbv_buffer_size
$B_n$: the buffer capacity in bits after time $t_n$
R: the bit rate (in bits per sec)
P: the number of ordinary pictures per second and $t_n$ the time when the n-th encoded picture is retrieved from the VBV buffer.

Figure 7:
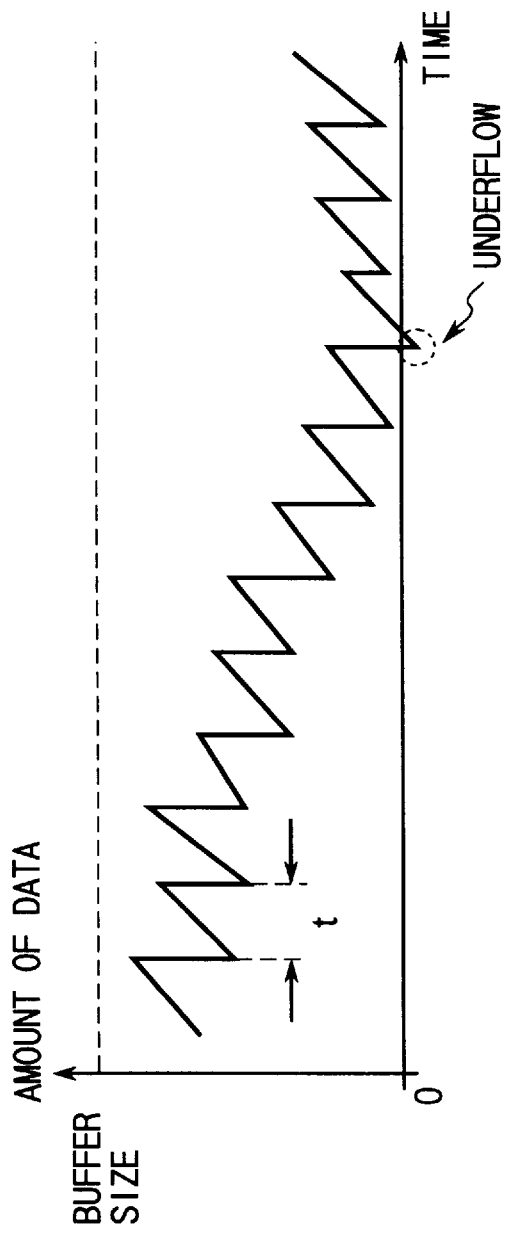
FIG. 7 is a diagram showing the change in the amount of data in a reproduction buffer which develops an underflow.

According to this invention, only the I-pictures are extracted. Since the size of the I-picture is not fixed, the amount of the decoding process would be varied easily causing an overflow or underflow, if no action is taken against it. This state is shown in FIG. 7. In view of the variations of the I-picture size, the amount of the decoding process is not settled, sometimes resulting in an underflow. According to this invention, the extracted I-pictures are padded to prevent this inconvenience.

Now, the padding operation will be explained in detail.

Figure 8:
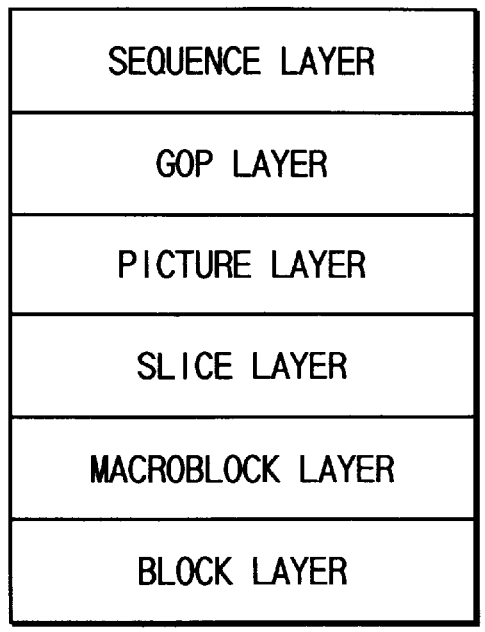
FIG. 8 is a diagram showing a hierarchical configuration of MPEG2 image data.

As described above, all the I-pictures are padded in order to assure normal decoding operation in the case where the reproduction is carried out at a designated bit rate. Specifically, for assuring a constant packet data length, a dummy data (such as "0") is buried in the I-picture. FIG. 8 shows a hierarchical configuration of the MPEG2 image data. As shown in FIG. 8, the MPEG2 data is configured of a sequence layer, a GOP layer, a picture layer, a slice layer, a macro-block layer and a block layer. The ES (Elementary Stream) specification according to MPEG2 permits an arbitrary number of 0s to be inserted before the start code indicating the beginning of the slice layer. An arbitrary padding data thus is buried in this portion of the I-picture in accordance with a specified bit rate. In order to assure normal decoding operation at the time of reproduction at the specified bit rate, the size of the I-picture is adjusted by padding. The size of the I-picture is calculated from equation (2) below.

$$\text{I-picture size (in bits)} = \text{Rate} \times IV\_TIME - Hdr\_sz \tag{2}$$

Rate: designated bit rate (bbs)
Hdr_sz: the header size (in bits)
IV_TIME: a picture display interval (in seconds).

As seen from equation (2), the designated bit rate is multiplied by the picture display interval, and the size of the header is subtracted from the product, thus determining the size of the I-picture. Based on the size of the I-picture thus determined, 0s are padded by the padding means described above.

In the file for ordinary reproduction, the total size of the pictures is substantially the same for each GOP (between I-pictures) at the time of encoding. This is in order to prevent an overflow or underflow of the buffer held at the image output for decoding.

The moving picture data padded as described above are produced as an intermediate file 37.

The moving picture data in the intermediate file 37 have a frame structure of the moving picture data for trick play of rapid feed or reverse rapid feed. This moving picture data is aimed at assuring a constant amount of the decoding process by padding the extracted I-pictures and thus unifying the size thereof. Nevertheless, this is not enough. Specifically, as a result of extracting only the I-pictures from the moving picture data in the file 31 for ordinary reproduction, the number of pictures is reduced and the GOP has changed. For the data amount in the buffer to be stabilized, reproduction rate setting means 39 recalculates the bit rate for reproduction and sets it in the header of the moving picture data.

In this case, the bit rate is calculated according to the following equation.

$$\text{Reproduction rate (bps)} = (I\_sz + Hdr\_sz)/IV\_TIME \tag{3}$$

In equation (3) above
I_sz: the I-picture size (in bits)
Hdr_sz: the size (in bits) of the sequence header
IV_TIME: the picture display interval (sec).

Figure 9:
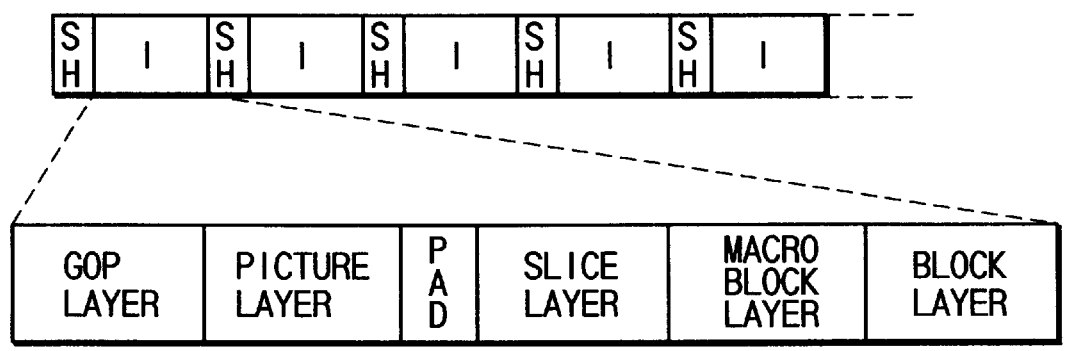
FIG. 9 is a diagram showing a configuration of the moving picture data padded by an image processing apparatus according to the first embodiment of the invention.

Thus, as shown in FIG. 9, the sum of the size of the I-picture (the same for each I-picture) padded and the size of the sequence header SH, divided by the picture display interval (fixed) for reproduction, gives a value set in the sequence header SH.

Figure 1:
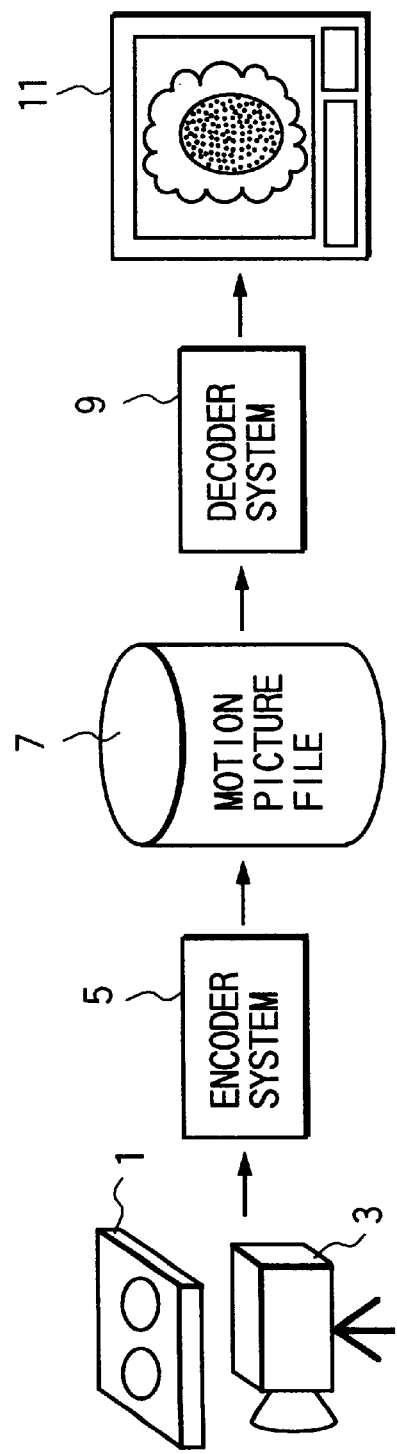
FIG. 1 is a diagram showing the flow of ordinary moving picture reproduction according to MPEG2.
Figure 2:
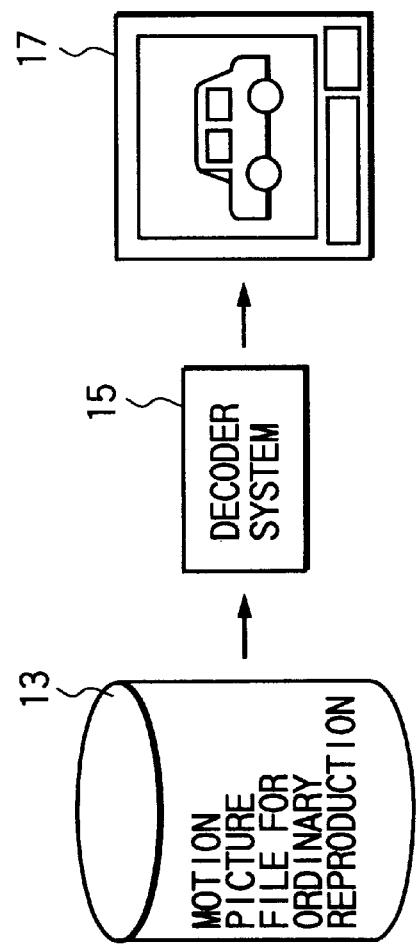
FIG. 2 is a diagram showing a conventional method of realizing a trick play.
Figure 10:
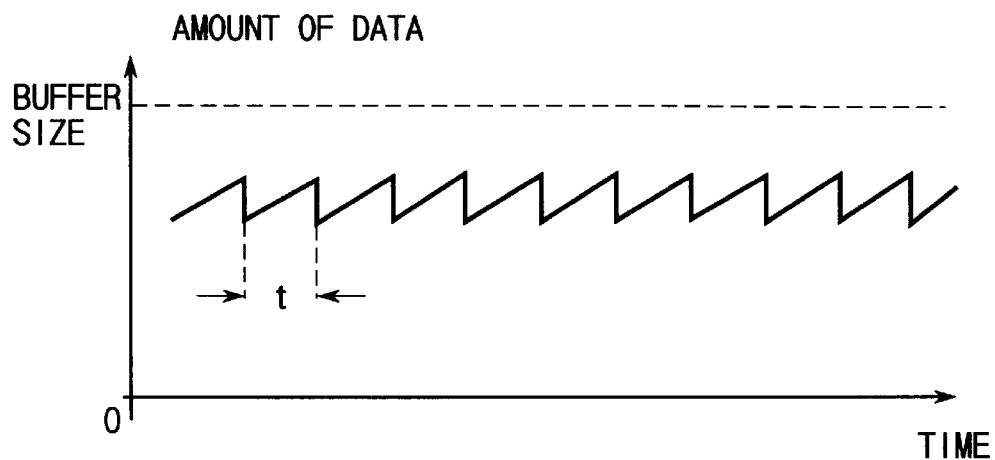
FIG. 10 is a diagram showing the change in the amount of the data in the buffer for reproducing the moving picture data produced according to the first embodiment of the invention.

In the manner described above, the moving picture data for rapid feed or reverse rapid feed are produced and accumulated in the moving picture file 41 for trick play. The moving picture data for rapid feed or reverse rapid feed in this moving picture file 41 for trick play are decoded and reproduced by the decoder system 9 shown in FIG. 1, for example, thereby to display the moving picture reproduced by rapid feed on the TV receiver 11. In the process, as a result of the reproduction carried out at the reproduction rate determined from equation (3), each frame (header and I-picture) of the same data amount is reproduced at the same reproduction rate and therefore the data amount in the buffer can be stabilized as shown in FIG. 10.

Figure 11:
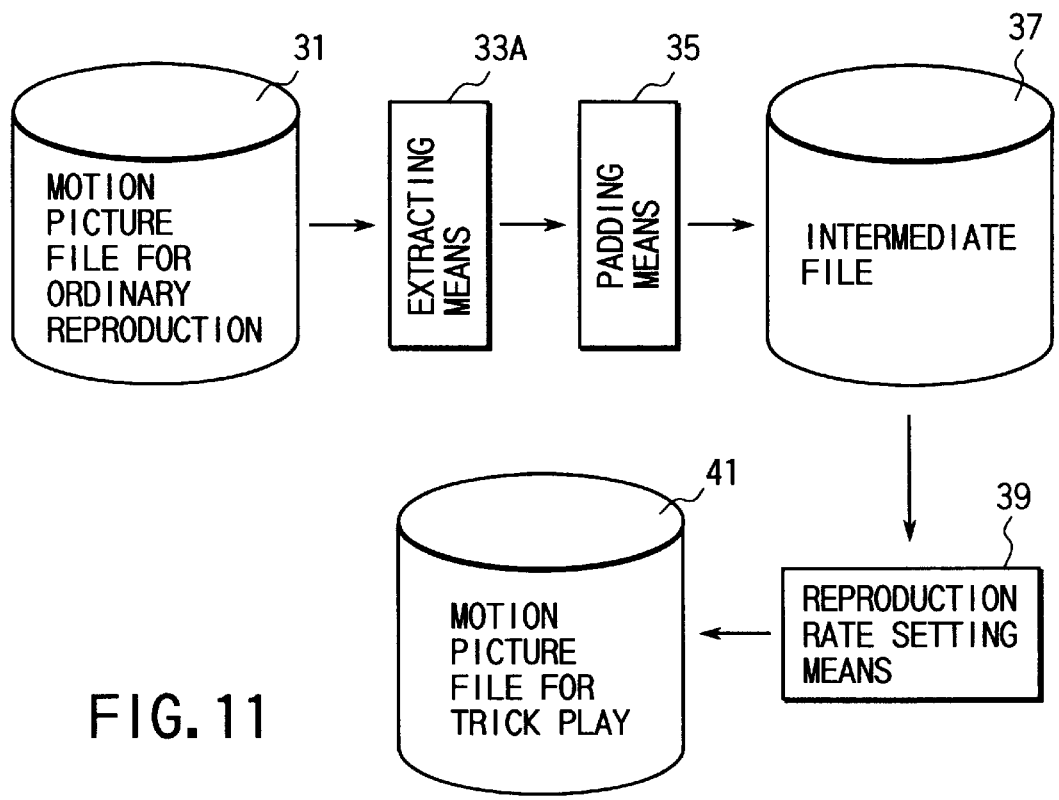
FIG. 11 is a block diagram showing a modification of the first embodiment of the invention.

FIG. 11 shows a modification of the first embodiment. This image processing apparatus comprises extracting means 33A for extracting only the I-pictures sequentially from the trailing end of the moving picture data in the file 31 for ordinary reproduction. The other part of the configuration is identical to the corresponding part of the first embodiment. Consequently, the extracting means 33A extracts the I-pictures from the trailing end of the moving picture data in the file 31 for ordinary reproduction and outputs them from the trailing end. The subsequent process is carried out in similar fashion, so that moving picture data for reverse rapid feed are accumulated in the moving picture file 41 for trick play. The moving picture data in the moving picture file 41 for trick play also has a reproduction rate determined from equation (3) and set in the sequence header. The reproduction is carried out based on this reproduction rate. Therefore, each frame (header and I-picture) of the same data amount is reproduced at the same reproduction rate and thus the data amount in the buffer can be stabilized.

Figure 12:
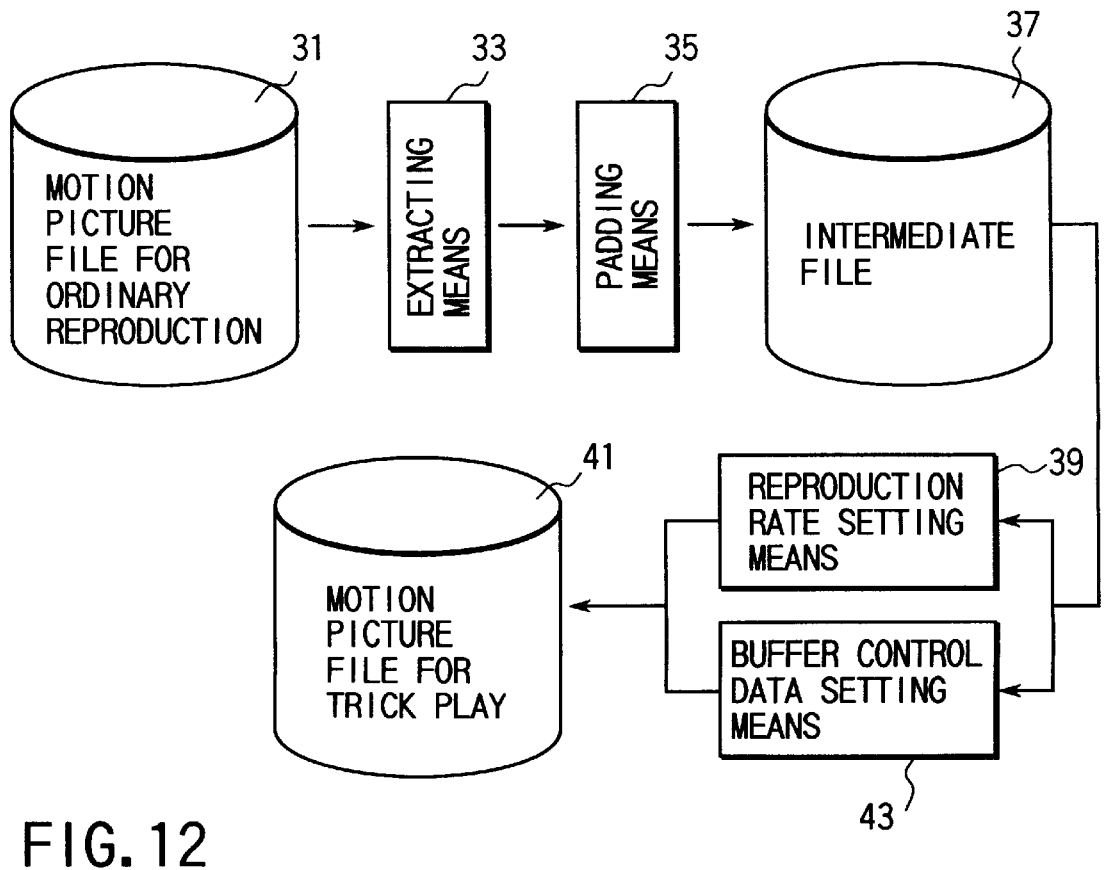
FIG. 12 is a block diagram showing an image processing apparatus according to a second embodiment of the invention.

FIG. 12 shows an image processing apparatus according to a second embodiment. This image processing apparatus is different from the image processing apparatus according to the first embodiment shown in FIG. 5 in the provision of buffer control information setting means 43. When reproducing the moving picture data in the intermediate file 37 output from the padding means 35, the buffer control information setting means 43 produces buffer control information for assuring proper reproduction start and proper random access and sets it in each frame header (in the picture layer) of the moving picture data.

An explanation will be given of the operation of the image processing apparatus configured as described above. The I pictures are extracted from the moving picture data in the file 31 for ordinary reproduction by the extracting means 33, and padded by the padding means 35 to produce an intermediate file 37. Then, the reproduction rate is calculated by the reproduction rate setting means 39. The information required for adjusting the data amount in the buffer at the time of random access is determined by the buffer control information setting means 43 for each picture and set in the header of each picture. This information is given by a four-byte integer called "vbv_delay" according to MPEG2 standard.

The information "vbv_delay" will be explained.

According to the MPEG standard, this "vbv_delay" is defined as follows.

The information vbv_delay is a 16-bit integer without sign. For the operation with a fixed bit rate, the initial occupancy rate of the decoder buffer is set using vbv_delay in such a manner as not to cause an overflow or underflow of the buffer of the decoder at the time of starting to decode the picture. The data vbv_delay is used to calculate the time required for filling the VBV buffer up to the right level immediately before removing the current picture from the buffer at a target bit rate R from the initial vacant state.

The value of vbv_delay is the number of periods of a 90 kHz system clock which must be awaited after the last byte of the picture start code is received by VBV. $vbv\_delay_n = 90000 * B_n^*/R$ where n>0, $B_n^*$ is the VBV occupancy rate measured in bits after removing the GOP layer data, the sequence header data and picture_start_code immediately preceding to the data element of the picture n immediately before removal of the picture n from the buffer. R is the bit rate expressed by the number of bits per second. An even more accurate bit rate than the rounded value encoded from the bit_rate field in the sequence header is used by the encoder of the VBV model. In the case of the operation performed at a bit rate not fixed, vbv_delay has a value of FFFF in hexadecimal notation.

Consider the case where reproduction is desired from an intermediate point of a moving picture, for example. Initially, no data is contained in the output buffer. Under this condition, reproduction is impossible. The decoder therefore is required to withhold performing the decoding operation until an appropriate amount of data are accumulated in the buffer. This waiting time is directly related to the value of vbv_delay. The calculation of the value vbv_delay depends on the picture flow and the reproduction rate. In the case of the moving picture file for trick play from which only the I-pictures have been extracted, therefore, normal operation is impossible (an underflow or overflow occurs) at the time of random access if the file is left in the original condition. Thus vbv_delay is recalculated and set newly for each picture. As a result, the data amount in the buffer can be correctly adjusted and normal operation becomes possible at the time of random access to the moving picture file for trick play.

Figure 13:
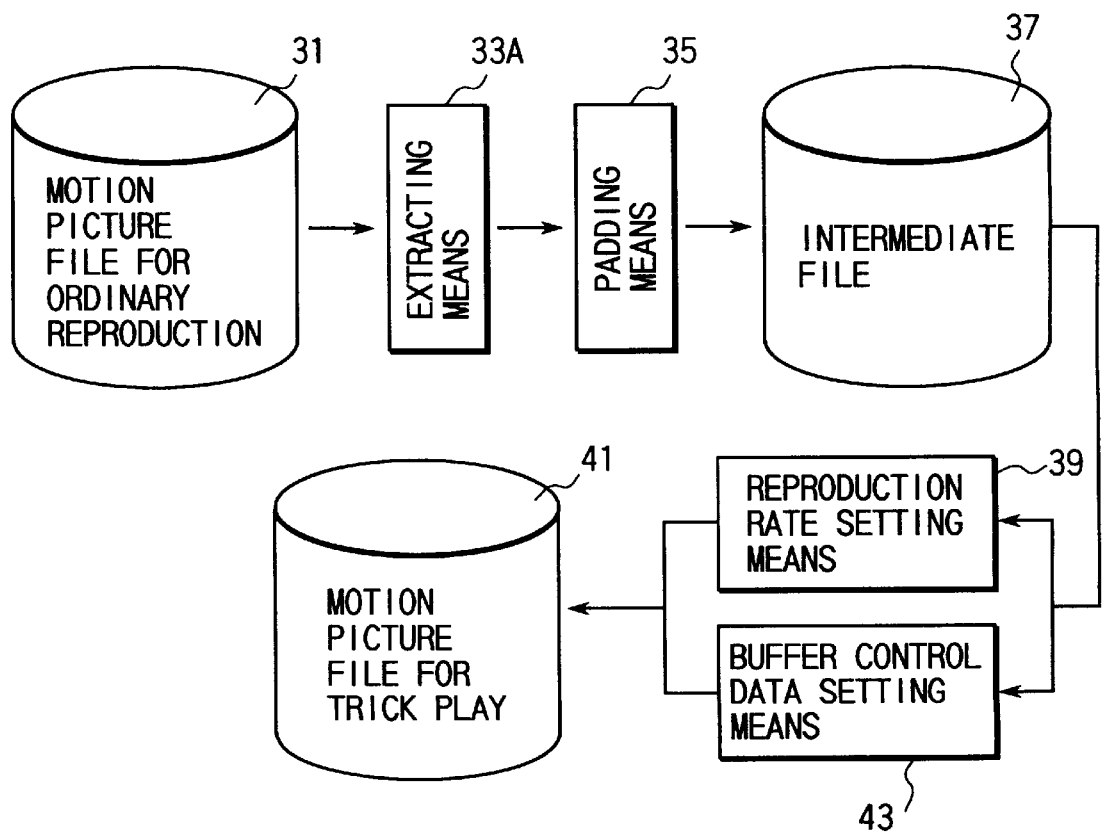
FIG. 13 is a block diagram showing a modification of the second embodiment of the invention.

FIG. 13 shows a modification of the second embodiment. This image processing apparatus comprises extracting means 33A for extracting only the I-pictures sequentially from the trailing end of the moving picture data in the file 31 for ordinary reproduction. The other configuration is the same as that of the second embodiment. Consequently, the I-pictures are extracted and output by the extracting means 33A from the trailing end of the moving picture data in the file 31 for ordinary reproduction. The subsequent steps are similar to the second embodiment, so that the moving picture data for reverse rapid feed are accumulated in the moving picture file 45 for trick play.

The moving picture file 45 for trick play includes the I-pictures extracted and arranged from the trailing end and a sequence header SH having a reproduction rate set by the reproduction rate setting means 39. Therefore, the moving picture data with vbv_delay set by the buffer control information setting means 43 is accumulated in the picture layer of the picture. In random access to this moving picture data, the initial data amount in the buffer can be correctly adjusted based on vbv_delay, thus making possible normal operation at the time of reverse rapid feed by random access.

Figure 14:
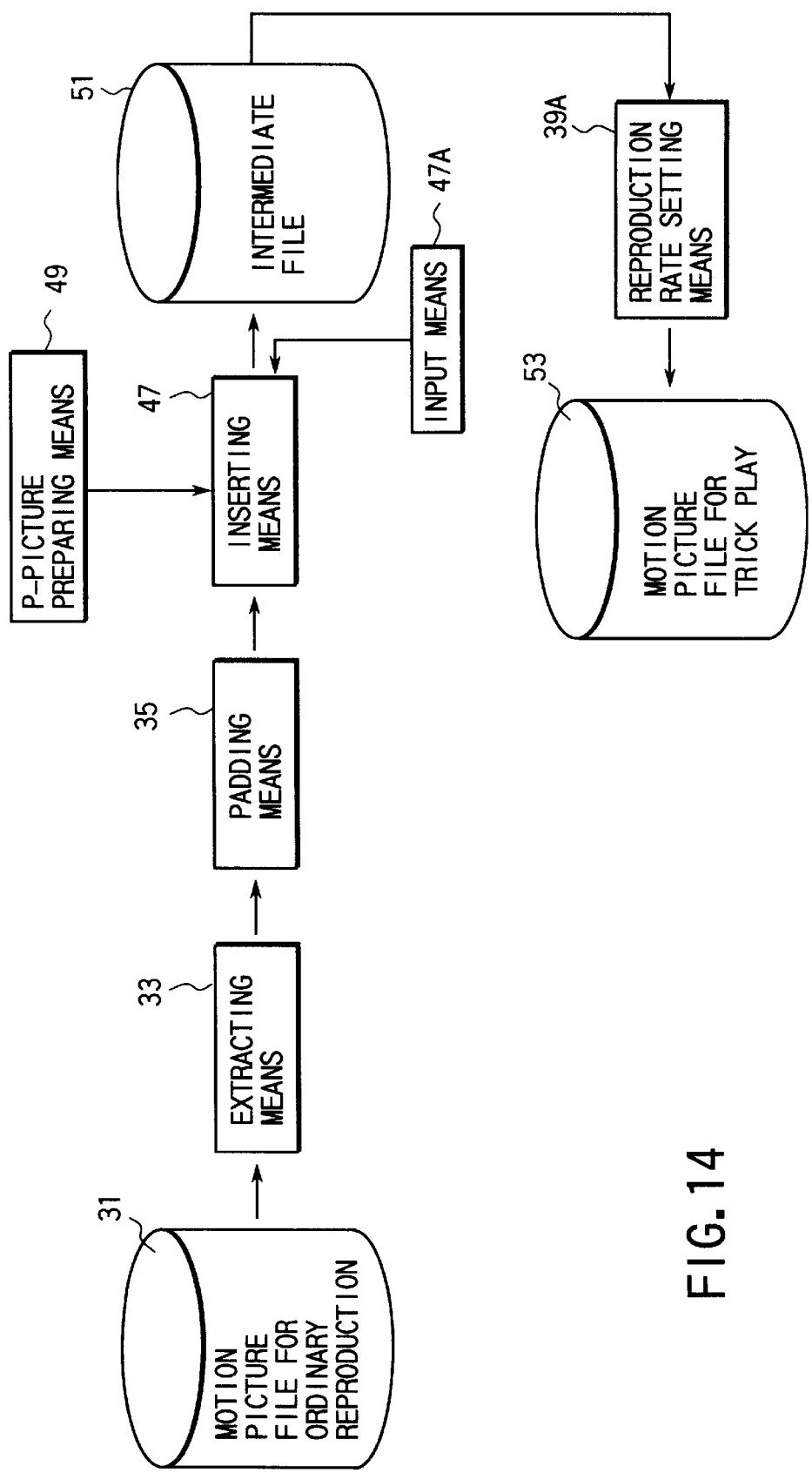
FIG. 14 is a block diagram showing an image processing apparatus according to a third embodiment of the invention.

FIG. 14 shows an image processing apparatus according to a third embodiment. This image processing apparatus is for producing the moving picture file 53 for trick play while changing the speed magnification of trick play, and is different from the image processing apparatus of the first embodiment shown in FIG. 5 in the provision of insertion means 47 and predictive image production means 49. The predictive image production means 49 is for producing P-pictures (interframe forward predictive image data) to be inserted between the I-pictures (intraframe coded image data) in the image data output from the padding means 35. The insertion means 47, on the other hand, is for inserting the P-pictures produced by the predictive image production means 49 between the I-pictures.

The operation of the image processing apparatus having this configuration will be explained. The I-pictures are extracted and output by the extracting means 33 from the head of the moving picture data in the file 31 for ordinary reproduction, and padded by the padding means 35. Based on these I-pictures, the predictive image production means 49 produces P-pictures to be inserted between the I-pictures. Since the P-pictures lack data for moving prediction, the same reproduced image of the P-picture as the immediately preceding one is displayed.

The insertion means 47 inserts each P-picture produced by the predictive image production means 49 between a given I-picture and the next I-picture. The number of I-pictures thus inserted is varied with the speed magnification (magnification), of which the desirable value is set by input means 47A, for example.

Now, the relation between the magnification of trick play and the number of P-pictures inserted will be explained. As described above, according to MPEG2, as long as the number of pictures between a given I-picture and the next I-picture, i.e. the size of GOP (group of pictures) is fixed, the very ratio of the sizes constitutes the magnification of trick play. Assume that the size of the GOP of a stream is m, for example. The number of P-pictures to be inserted for producing a rapid feed file of magnification n is given by equation (4) below.

$$\text{Number of P-pictures to be inserted} = m/n \quad (4)$$

The value obtained from equation (4) is an integer.

As described above, only the I-pictures are extracted from the moving picture data in the file 31 for ordinary reproduction, and the moving picture data with the P-pictures produced by the predictive image production means 49 and inserted between a given I-picture and the next I-picture are stored in the intermediate file 51. Then, in order to stabilize the data amount in the buffer, the reproduction rate setting means 39A calculates the reproduction rate from equation (5) below and sets the result in the sequence header SH of the moving picture data in the intermediate file 51.

$$\text{Reproduction rate (bps)} = (I\_sz + P\_sz \times P\_num + Hdr\_sz) \div (P\_num + 1)/IV\_TIME \quad (5)$$

I_sz: the size (in bits) of the I-picture
P_sz: the size (in bits) of the P-picture
P_num: the number of P-pictures to be inserted
Hdr_sz: the header size (in bits)
IV_TIME is the intervals of picture display (in seconds).

Figure 15:
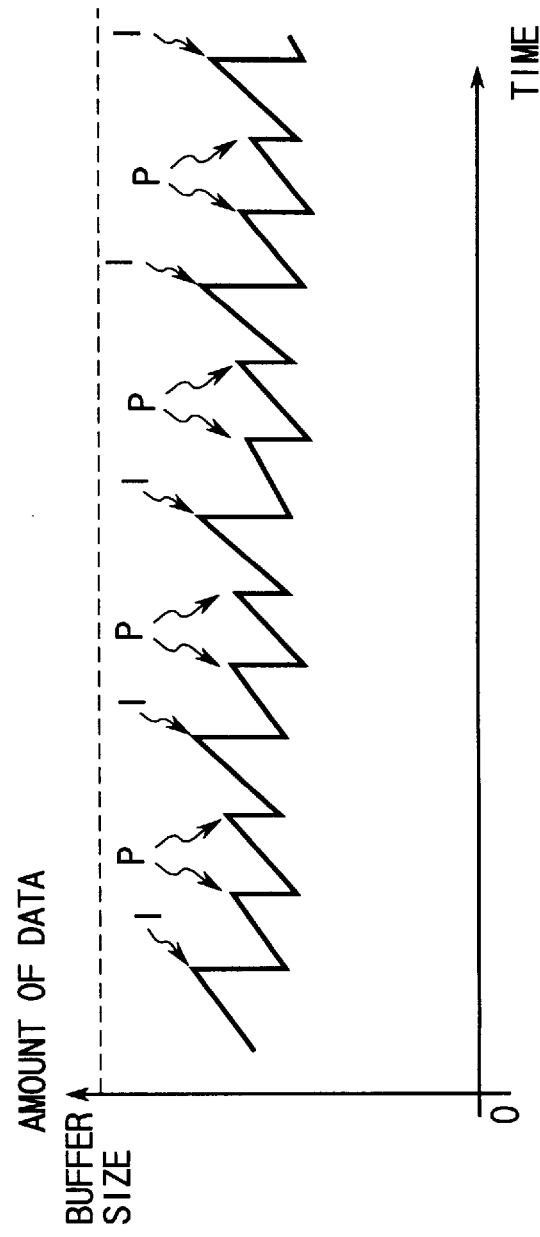
FIG. 15 is a diagram showing the change in the amount of the data in the buffer for reproducing the moving picture data produced according to the third embodiment of the invention.

In the above-described manner, the moving picture data for rapid feed and reverse rapid feed are produced and accumulated in the moving picture file 53 for trick play. The moving picture data for rapid feed or reverse rapid feed stored in the moving picture file 53 for trick play are decoded and reproduced by the decoder system 9 shown in FIG. 1, for example. Thus, the moving picture reproduced by rapid feed and reverse rapid feed is displayed on the TV receiver 11. In the process, the I-pictures and the P-pictures are reproduced at the reproduction rate determined according to equation (5). As a result, as shown in FIG. 15, the data amount in the buffer undergoes variations within a predetermined range. FIG. 15 refers to the case in which two P-pictures are inserted.

Figure 16:
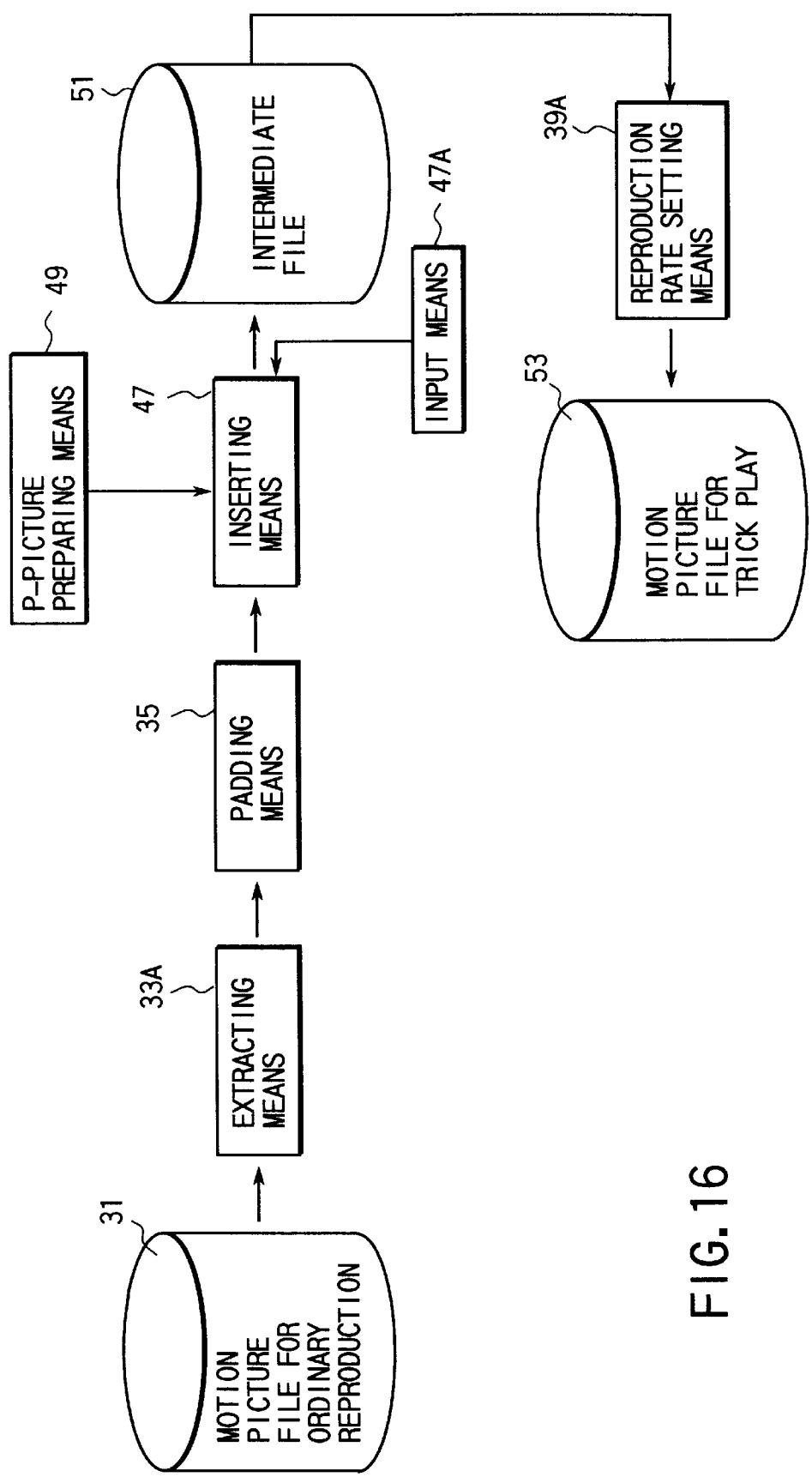
FIG. 16 is a block diagram showing a modification of the third embodiment of the invention.

FIG. 16 shows a modification of the third embodiment. This image processing apparatus has the same configuration as the third embodiment except for the provision of extracting means 33A for extracting the I-pictures alone from the trailing end of the moving picture data in the file 31 for ordinary reproduction. Thus, the moving picture data for reverse rapid feed can be obtained which are reproduced in such a manner that the data amount in the buffer undergoes variations in a predetermined range.

Figure 17:
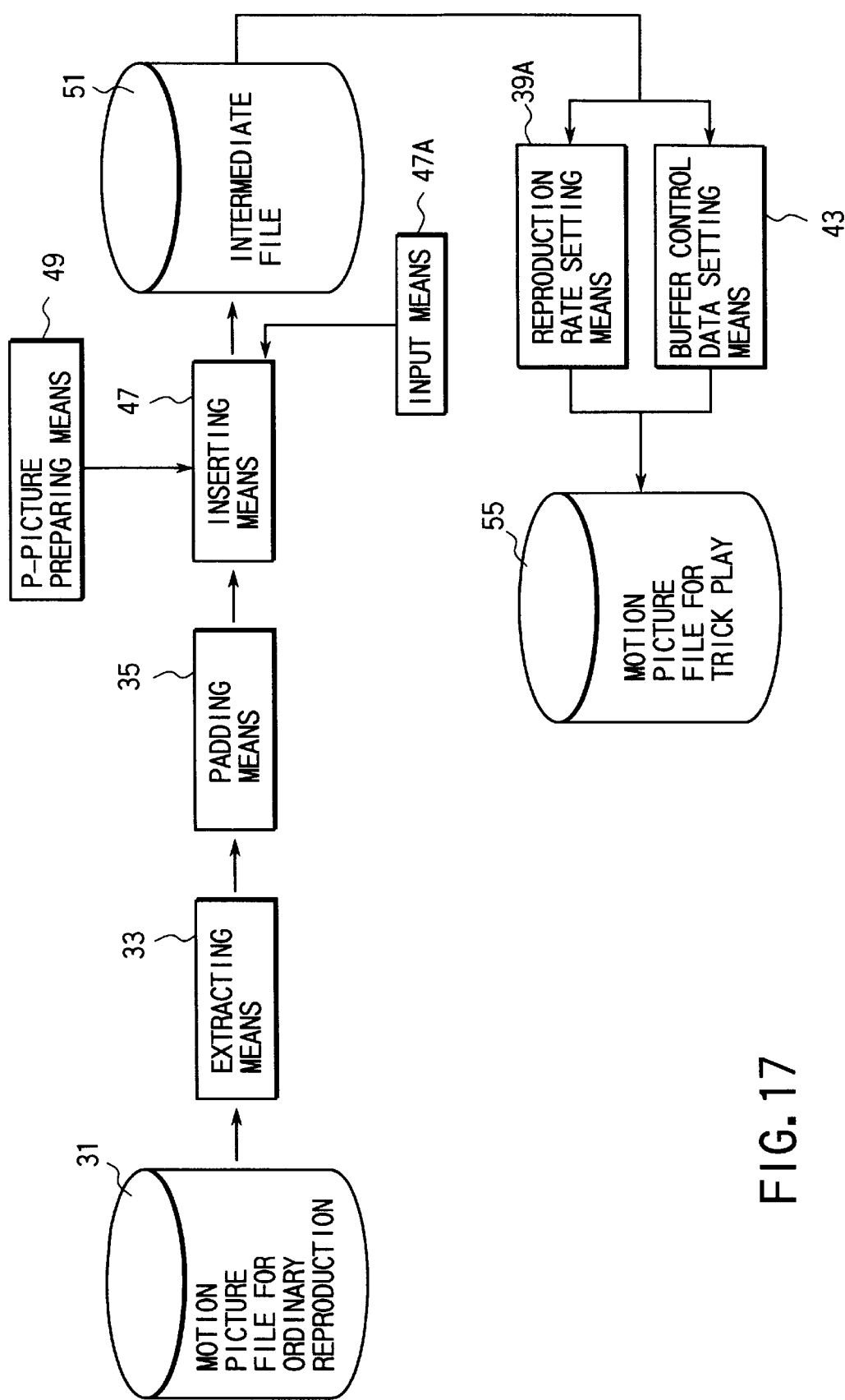
FIG. 17 is a block diagram showing an image processing apparatus according to a fourth embodiment of the invention.

FIG. 17 shows an image processing apparatus according to a fourth embodiment. In this embodiment, the moving picture data randomly accessible at the time of reproduction can be obtained in the moving picture file 55 for trick play. The operation of the image processing apparatus having this configuration will be explained. The I-pictures are extracted by the extracting means 33 from the moving picture data in the file 31 for ordinary reproduction, and padded by the padding means 35. Based on the I-pictures thus obtained, the predictive image production means 49 produces the P-pictures to be inserted between the I-pictures. Each P-picture produced by the predictive image production means 49 is inserted between a given I-picture and the next I-picture by insertion means 47 thereby to produce an intermediate file 51. Then, the reproduction rate is calculated in a similar manner to the third embodiment by reproduction rate setting means 39A. On the other hand, the information (vbv_delay) required for adjusting the data amount in the buffer at the time of random access is determined for each picture by buffer control information setting means 43 and set in the header of each picture.

As a result, the moving picture file 55 for trick play has accumulated therein the moving picture data including the I-pictures extracted from the head of the moving picture data, the P-pictures produced, and a sequence header SH containing the reproduction rate set by the reproduction rate setting means 39A, and also the vbv_delay data set by the buffer control information setting means 43 in the picture layer of the picture. In randomly accessing this moving picture data, the initial data amount in the buffer can be correctly adjusted based on the vbv_delay data thereby making possible normal operation for rapid feed.

Figure 18:
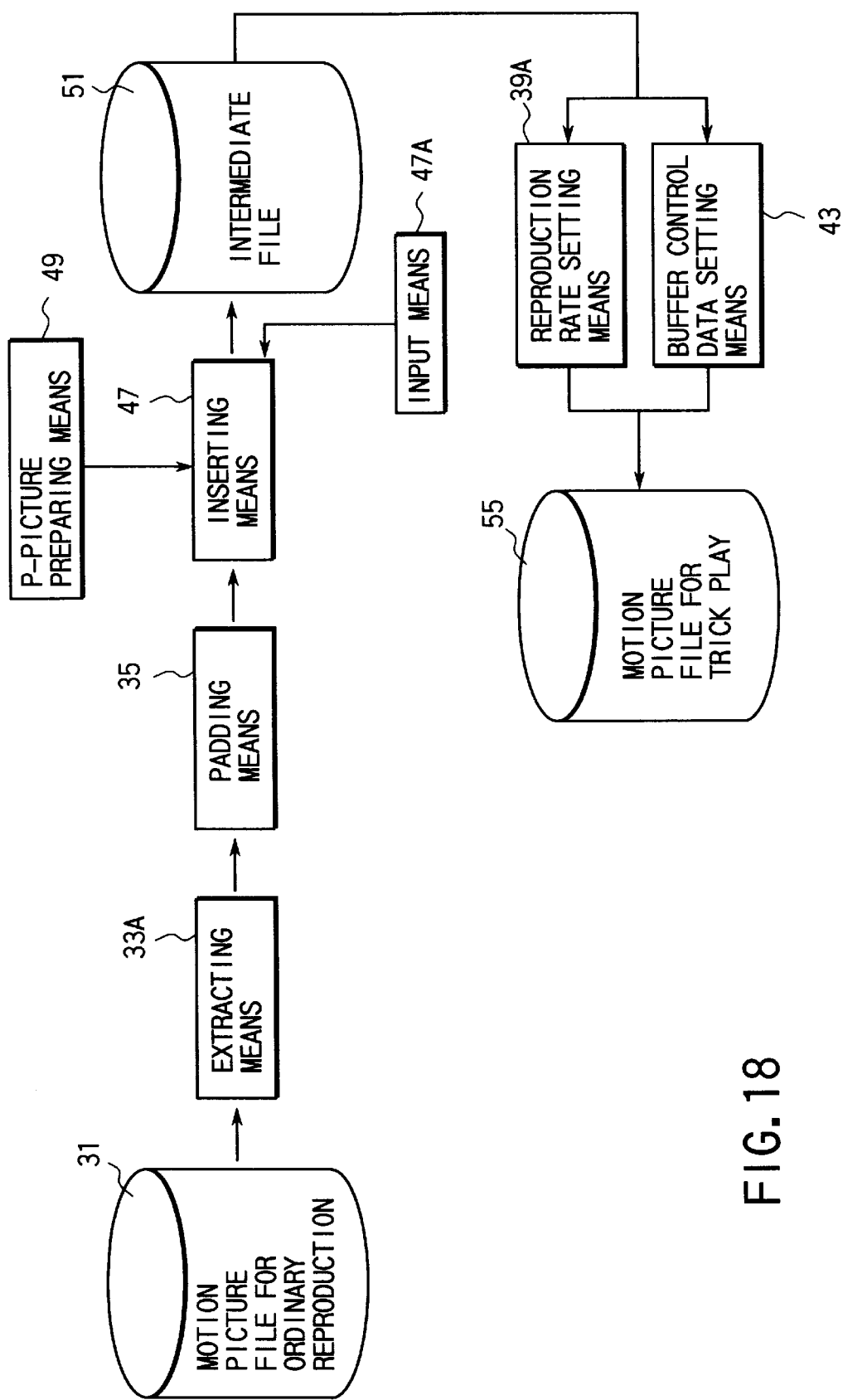
FIG. 18 is a block diagram showing a modification of the fourth embodiment of the invention.

FIG. 18 shows a modification of the fourth embodiment. This image processing apparatus has a similar configuration to the fourth embodiment, except that it further comprises extracting means 33A for extracting the I-pictures sequentially from the trailing end of the moving picture data in the file 31 for ordinary reproduction. According to this modification, the moving picture file 55 for trick play has accumulated therein the moving picture data including the sequence header SH containing the reproduction rate extracted from the trailing end of the moving picture data and the vbv_delay data set by the buffer control information setting means 43 in the picture layer of the picture. In randomly accessing this moving picture data, the initial data amount in the buffer can be correctly adjusted based on the vbv_delay data and thus normal operation is made possible for reverse rapid feed.

According to the third and fourth embodiments, the pseudo-slow reproduction is also made possible by increasing the number of pictures inserted by the insertion means 47 as compared with the number of pictures in each GOP of the original moving picture data from which the I-pictures are extracted.

Figure 19:
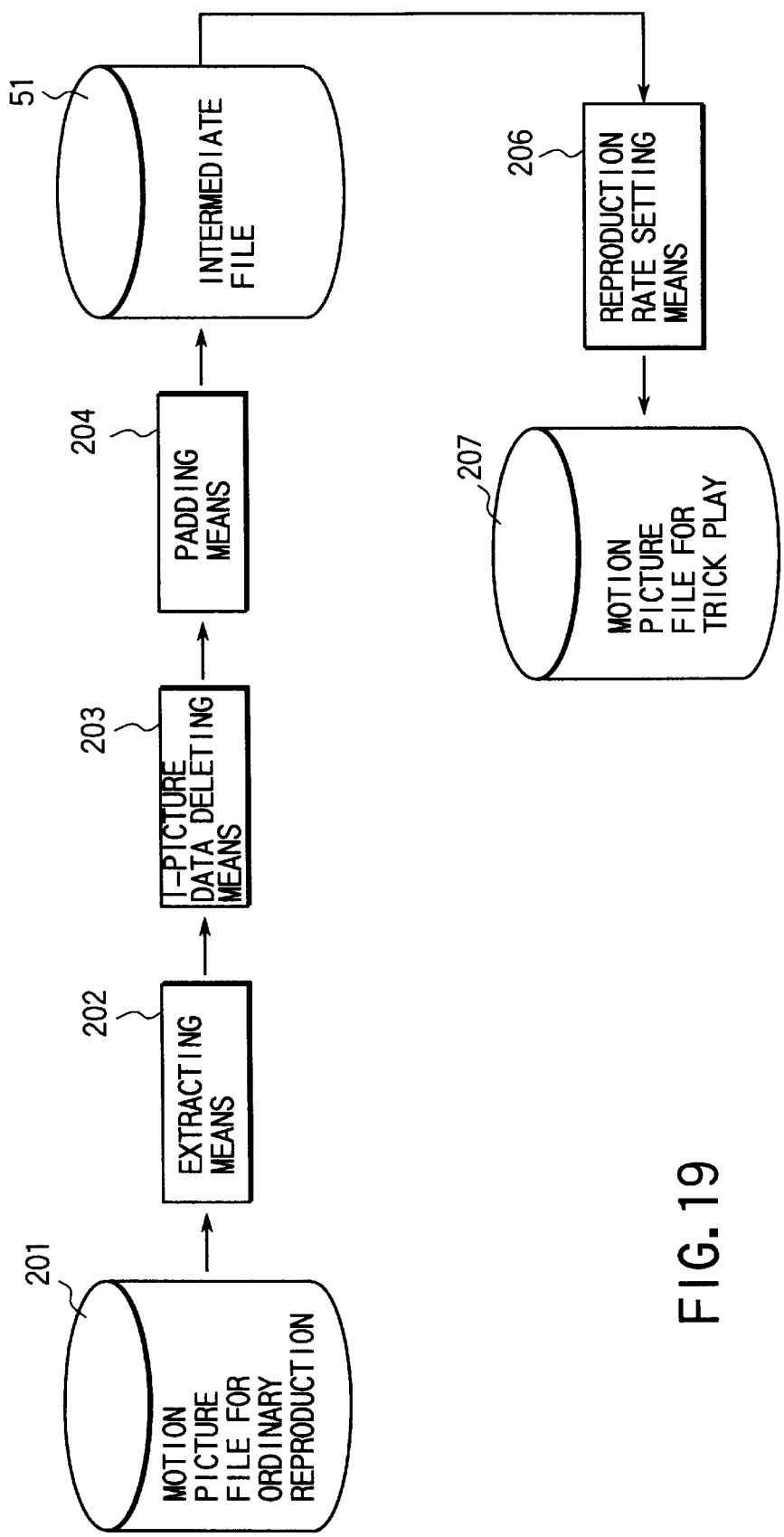
FIG. 19 is a block diagram showing an image processing apparatus according to a fifth embodiment of the invention.

FIG. 19 is a system block diagram showing an image processing apparatus according to a fifth embodiment of the invention. According to this embodiment, the moving picture data in a file 201 for ordinary reproduction encoded by an encoder based on MPEG2 are processed using extracting means 202, intraframe information reduction means 203, padding means 204 and reproduction rate setting means 206.

In this configuration, the extracting means 202 extracts only the I-pictures (intraframe coded image data) sequentially from the head or the trailing end of the moving picture data. The intraframe information reduction means 203, on the other hand, reduces the information of each I-picture extracted by the extracting means and thereby reduces the size of each I-picture. The padding means 204 buries an arbitrary padding code ("0") in the I-pictures output from the intraframe information reduction means 203 in accordance with a specified bit rate. The reproduction rate setting means determines a reproduction rate and sets it in the header of moving picture data output from the padding means 204 in such a manner as not to cause any overflow or underflow of a buffer when decoding and reproducing the particular moving picture data.

Figure 20:
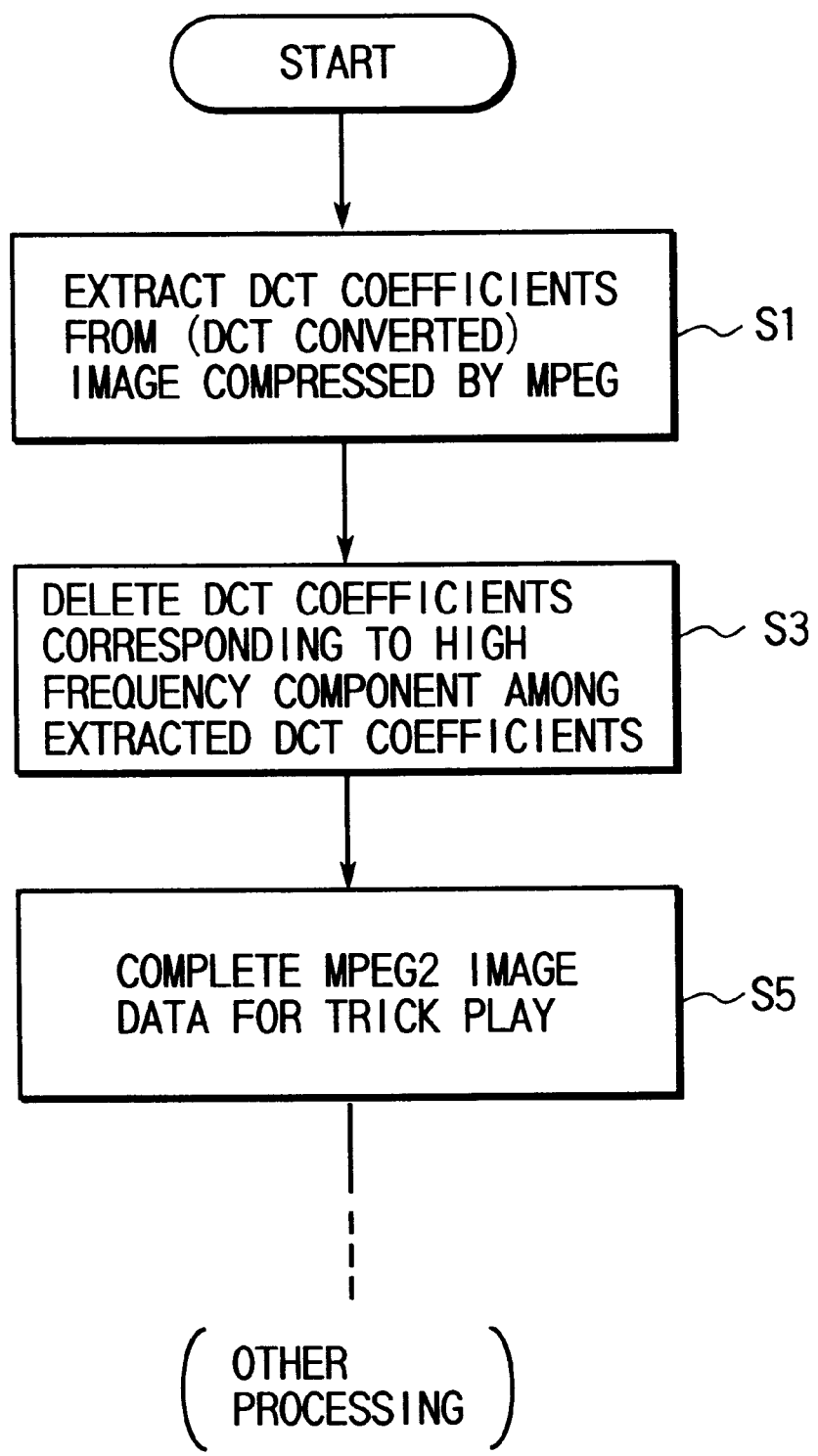
FIG. 20 is a flowchart showing the process of the intraframe information reduction means of FIG. 19.

The operation of the image processing apparatus having the above-mentioned configuration will be explained. The extracting means 202 begins to extract the I-pictures from the head of the file 201 when producing a moving picture file for rapid feed and from the trailing end of the file 201 when producing a moving picture file for reverse rapid feed. The intraframe information reduction means 203 reduces the information of each I-picture extracted by the extracting means 202 thereby to reduce the size of each I-picture. The intraframe information is reduced by the method in which the DCT coefficients obtained at the time of the above-mentioned DCT operation are reduced. The DCT coefficient is determined for each macro block. The DCT coefficient is divided into a DC component and an AC component quantized independently of each other. Among the AC components, a part of the coefficients corresponding to low frequencies is held while the coefficients corresponding to high frequencies are reduced. The coefficients are reduced uniformly from all the macro blocks, for example, or in different numbers for different macro blocks. As another alternative, the DCT coefficients are not reduced for the blocks containing only a few of them but reduced for the blocks having many of them. According to this embodiment, the DCT coefficients are reduced by software. Specifically, as shown in the flowchart of FIG. 20, DCT coefficients are extracted from (DCT converted) image compressed by MPEG in step S1. Then, in step S3, the DCT coefficients corresponding to high frequency component are deleted among the extracted coefficients. Thus, the MPG2 image data for trick play is completed in step S5. The resulting information are padded by the padding means 204. The rate setting means 206 sets a specified bit rate in the header of the moving picture file. The moving picture file for trick play can thus be produced by the above-mentioned series of operations.

Figure 21:
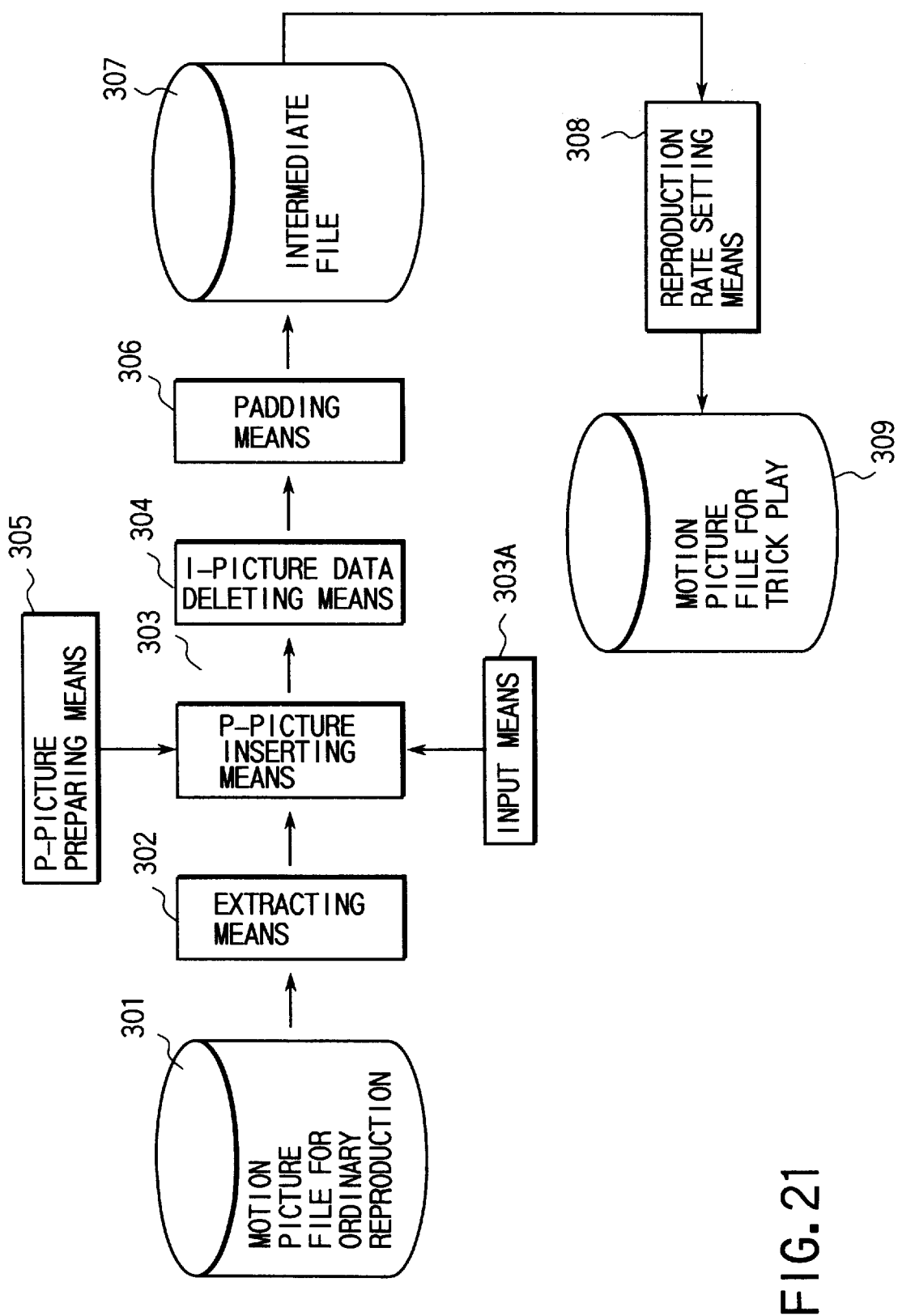
FIG. 21 is a block diagram showing an image processing apparatus according to a sixth embodiment of the invention.

FIG. 21 is a system block diagram showing an image processing apparatus according to a sixth embodiment of the invention. The embodiment of FIG. 21 is for producing the moving picture file 309 for trick play in the case of changing the trick play speed magnification according to the embodiment of FIG. 21. As compared with the image processing apparatus according to the fifth embodiment shown in FIG. 19, this embodiment further comprises predictive image production means 305 and intraframe forward predictive coded image insertion means 303. The predictive image production means 305 produces the P-pictures (interframe forward predictive image data) to be inserted between the I-pictures (intraframe coded image data) in the moving picture data output from the extracting means 302. Also, the interframe forward predictive coded image insertion means 303 inserts the P-pictures produced by the predictive image production means 305 between I-pictures.

The operation of the image processing apparatus having this configuration will be explained.

First, the I-pictures are retrieved from the moving picture file 301 for ordinary reproduction by the extracting means 302 in the same manner as in the first embodiment. In the process, as in the first embodiment, the I-pictures are retrieved from the head of the moving picture data for rapid feed and from the trailing end of the moving picture data for reverse rapid feed. Based on the I-pictures extracted by the extracting means 302, the predictive image production means 305 produces P-pictures each to be inserted between the I-pictures. The P-pictures contain no data on moving prediction, and therefore a reproduced image of a P-picture is displayed in the same form as the immediately preceding I-picture.

The interframe forward predictive coded image insertion means 303 inserts each of the P-pictures produced by the predictive image production means 305 between a given I-picture and the next I-picture. The number of the P-pictures thus inserted is changed by the speed magnification (magnification), so that the desired speed magnification is set by input means 303A, for example. By changing the number of the P-pictures inserted, the time intervals at which the I-pictures are processed are changed thereby making it possible to change the speed magnification.

After inserting the P-pictures as described above, the DCT coefficients of the I-pictures are reduced by the intraframe information reduction means 304. In such a manner as to perform the normal decoding operation when reproducing the data at a specified bit rate, the size of the I-picture is adjusted by the padding means 306. In the process, the size of the I-picture is determined from equation (6).

$$\text{I-picture size (in bits)} = \text{Rate} \times (P\_num+1)/IV\_TIME - (P\_sz \times P\_num + Hdr\_sz) \quad (6)$$

Rate: a designated bit rate (in bits)
P_sz: the size (in bits) of the P-picture
Hdr_sz: the size (in bits) of the header
P_num: the number of P-pictures inserted
IV_TIME: the intervals of picture display (in seconds).

In the manner described above, the number of high-frequency components of the DCT coefficients is adjusted, thereby producing a moving picture file for trick play (Preproducible at a designated bit rate and variable in magnification with a lower disk capacity consumption.

Figure 22:
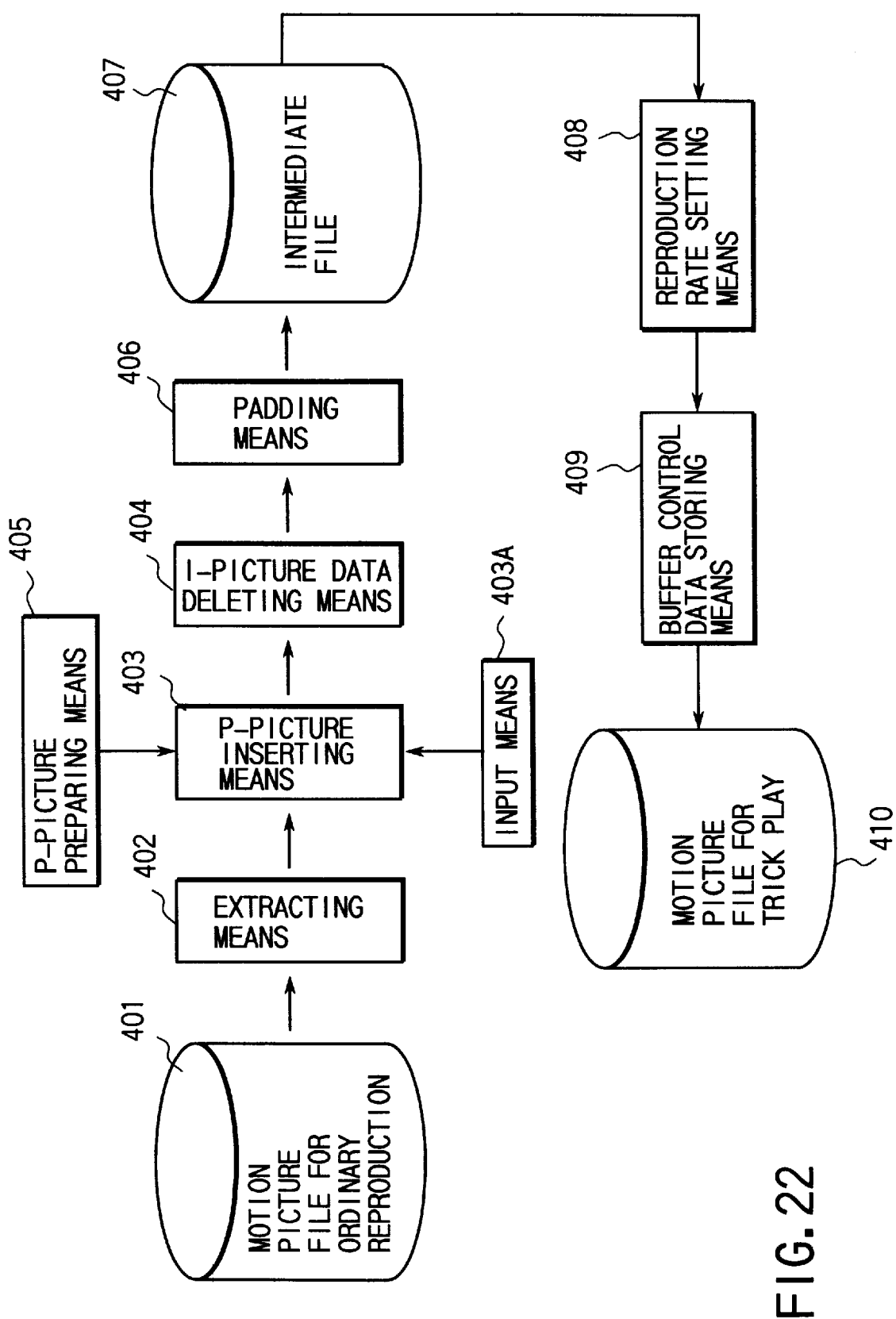
FIG. 22 is a block diagram showing an image processing apparatus according to a seventh embodiment of the invention.

FIG. 22 is a system block diagram showing an image processing apparatus according to a seventh embodiment of the invention. According to this embodiment, the moving picture data randomly accessible at the time of reproduction can be obtained in the moving picture file 410 for trick play. The operation of the image processing apparatus having this configuration will be explained. The I-pictures are extracted by extracting means 402 from the moving picture data in the moving picture file 401 for ordinary reproduction. Based on these I-pictures, predictive image production means 405 produces P-pictures to be inserted between the I-pictures. Intraframe forward predictive image insertion means 403 inserts each P-picture produced by the predictive image production means 405 between a given I-picture and the next I-picture. Then, intraframe information reduction means 404 reduces the DCT coefficients of the I-pictures, and the moving picture data are then padded by padding means 406 thereby to produce an intermediate file 407. As the next step, buffer control information storage means 408 determines data vbv_delay required for adjusting the data amount in the buffer at the time of random access for each picture and sets it in the header of each picture.

Then, reproduction rate setting means 409 calculates the reproduction rate in a similar fashion to the sixth embodiment.

As a result, the moving picture file 410 for trick play has accumulated therein the moving picture data including the I-pictures extracted from the head or trailing end of the data, the P-pictures produced, and a sequence header SH having the reproduction rate set by the reproduction rate setting means 409, and also the data vbv_delay set by the buffer control information setting means 408 in the header of the picture layer of picture. In randomly accessing this moving picture data, the initial data amount in the buffer can be correctly adjusted based on the data vbv_delay and thereby normal operation is made possible for rapid feed and reverse rapid feed.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video server system for supplying video data through a network to a client system in response to a request, comprising
    a disk system for storing video data; and
    a video server including:
        means for reading the video data stored in said disk system;
        means for extracting intraframe coded image data from the video data, sequentially from the head of the video data;
        means for reducing the information in said intraframe coded image data;
        padding means for inserting a padding code in the intraframe coded image data to satisfy a designated bit rate;
        first setting means for setting a designated rate for reproduction in a header of said moving picture data; and
        second setting means for setting buffer control information in the header indicating a start position and random access position.

2. An image processing method for a video server system for supplying video data through a network to a client system in response to a request, comprising the steps of:
    extracting only intraframe coded image data from the video data, sequentially from the head of said video data;
    reducing the information in the intraframe coded image data extracted;
    inserting a padding code in the intraframe coded image data to satisfy a designated bit rate for reproduction; and
    setting said designated bit rate for reproduction in a header of said moving picture data.

3. An image processing apparatus for sending out and reproducing at a fixed rate the moving picture data encoded by compression using the interframe prediction, comprising:
    extracting means for extracting only intraframe coded image data from the moving picture, sequentially from the trailing end of said moving picture data;
    padding means for inserting a padding code in the intraframe coded image data in such a manner as to secure the same size as the maximum one of said intraframe coded image data extracted;
    predictive image production means for producing interframe forward predictive image data to be inserted between the intraframe coded image data in the moving picture data output from said padding means;
    insertion means for inserting the interframe forward predictive image data produced by said predictive image production means between said intraframe coded image data; and
    first setting means, in a header of said moving picture data, for setting a reproduction rate into a header of the moving picture data, causing no overflow or underflow of a buffer at the time of decoding and reproducing the moving picture data output from said padding means.

4. The apparatus according to claim 3, further comprising:
    second setting means for setting buffer control information in the header indicating a start position and random access position when reproducing the moving picture data output from said insertion means.

5. An image processing apparatus for sending out and reproducing at a fixed rate the moving picture data encoded by compression using the interframe prediction, comprising:
    extracting means for extracting only intraframe coded image data from said moving picture data, sequentially from the head of said moving picture data,
    reduction means for reducing the information in said intraframe coded image data;
    padding means for inserting a padding code in the intraframe coded image data to satisfy a designated bit rate; and
    first setting means for setting the designated bit rate for reproduction in a header of said moving picture data.

6. The apparatus according to claim 5, further comprising:
    second setting means for setting buffer control information in the header indicating a start position and random access position when reproducing the moving picture data with said padding code inserted therein.

7. An apparatus according to claim 5, wherein said extracting means extracts only the intraframe coded image data sequentially from the head of said moving picture data for rapid feed of said moving picture data.

8. An apparatus according to claim 5, wherein said extracting means extracts only the intraframe coded image data sequentially from the trailing end of said moving picture data for reverse rapid feed of said moving picture data.

9. An apparatus according to claim 5, wherein said reduction means reduces the DC components of the DCT coefficients corresponding to high frequencies at the time of discrete cosine transform (DCT) of said intraframe coded image data.

10. An image processing apparatus for sending out and reproducing at a fixed rate the moving picture data encoded by compression using the interframe prediction, comprising:
    extracting means for extracting only intraframe coded image data from said moving picture data, sequentially from the head of said moving picture data;
    reduction means for reducing the information in said intraframe coded image data;
    padding means for inserting a padding code in the intraframe coded image data to satisfy a designated bit rate;
    predictive image production means for producing interframe forward predictive image data to be inserted between the intraframe coded image data in the moving picture data with said padding data inserted therein;

insertion means for inserting said produced interframe forward predictive image data between said intraframe coded image data; and first means for setting the designated bit rate in the header of said moving picture data.

11. The apparatus according to claim 10, further comprising:

second setting means for setting buffer control information in the header indicating a start position and a random access position, when reproducing said moving picture data with said intraframe forward predictive image data inserted therein.

12. An image processing apparatus for sending out and reproducing at a fixed rate the moving picture data encoded by compression using the interframe prediction, comprising:

extracting means for extracting only intraframe coded image data from said moving picture data, sequentially from the trailing end of said moving picture data;

reduction means for reducing the information in said intraframe coded image data;

padding means for inserting a padding code in the intraframe coded image data to satisfy a designated bit rate; and fist setting means for setting said designated bit rate in the header of said moving picture data.

13. The apparatus according to claim 12, further comprising:

second setting means for setting buffer control information in the header indicating a start position and a random access position, when reproducing said moving picture data with said padding code inserted therein.

14. An image processing apparatus for sending out and reproducing at a fixed rate the moving picture data encoded by compression using the interframe prediction, comprising:

extracting means for extracting only intraframe coded image data from said moving picture data, sequentially from the trailing end of said moving picture data;

reduction means for reducing the information in said intraframe coded image data;

padding means for inserting a padding code in the intraframe coded image data to satisfy a designated bit rate;

predictive image production means for producing interframe forward predictive image data to be inserted between the intraframe coded image data in the moving picture data with said padding code inserted therein;

insertion means for inserting said interframe forward predictive image data between said intraframe coded image data; and first setting means for setting said bit rate in the header of said moving picture data.

15. The apparatus according to claim 14, further comprising:

second setting means for setting buffer control information in the header indicating a start position and a random access position, when reproducing the moving picture data with said intraframe forward predictive image inserted therein.

16. An image processing apparatus for sending out and reproducing at a fixed rate the moving picture data encoded by compression using the interframe prediction, comprising:

extracting means for extracting only intraframe coded image data sequentially from the head of said moving picture data;

padding means for inserting a padding code in each intraframe coded image data in such a manner as to secure the same size as the maximum one of said intraframe coded image data extracted;

reproduction rate setting means for determining a reproduction rate which causes no overflow or underflow of a buffer at the time of decoding and reproducing the moving picture data output from said padding means and setting said reproduction rate in the header of said moving picture data; and buffer control information setting means for producing buffer control information for assuring proper start of reproduction and proper random access at the time of reproducing the moving picture data output from said padding means and setting said buffer control information in each frame header of said moving picture data.

17. An image processing apparatus for sending out and reproducing at a fixed rate the moving picture data encoded by compression using the interframe prediction, comprising:

extracting means for extracting only intraframe coded image data sequentially from the head of said moving picture data;

padding means for inserting a padding code in each intraframe coded image data in such a manner as to secure the same size as the maximum one of said intraframe coded image data extracted;

reproduction rate setting means for determining a reproduction rate which causes no overflow or underflow of a buffer at the time of decoding and reproducing the moving picture data output from said padding means and setting said reproduction rate in the header of said moving picture data;

predictive image production means for producing interframe forward predictive image data to be inserted between the intraframe coded image data in the moving picture data output from said padding means; and insertion means for inserting the interframe forward predictive image data produced by said predictive image production means between said intraframe coded image data;

and wherein said reproduction rate setting means determines a reproduction rate which causes no overflow or underflow of a buffer at the time of decoding and reproducing the moving picture data output from said padding means and setting said reproduction rate in the header of said moving picture data.

18. An image processing apparatus for sending out and reproducing at a fixed rate the moving picture data encoded by compression using the interframe prediction, comprising:

extracting means for extracting only intraframe coded image data sequentially from the head of said moving picture data;

padding means for inserting a padding code in each intraframe coded image data in such a manner as to secure the same size as the maximum one of said intraframe coded image data extracted;

reproduction rate setting means for determining a reproduction rate which causes no overflow or underflow of a buffer at the time of decoding and reproducing the moving picture data output from said padding means and setting said reproduction rate in the header of said moving picture data;

predictive image production means for producing interframe forward predictive image data to be inserted between the intraframe coded image data in the moving picture data output from said padding means;

insertion means for inserting the interframe forward predictive image data produced by said predictive image production means between said intraframe coded image data; and buffer control information setting means for producing the buffer control information for assuring proper start of reproduction and proper random access and setting said buffer control information in each frame header of said moving picture data when reproducing the moving picture data output from said insertion means.

19. An image processing apparatus for sending out and reproducing at a fixed rate the moving picture data encoded by compression using the interframe prediction, comprising:

extracting means for extracting only intraframe coded image data sequentially from the trailing end of said moving picture data;

padding means for inserting a padding code in each intraframe coded image data in such a manner as to secure the same size at the maximum one of said intraframe coded image data extracted;

reproduction rate setting means for determining a reproduction rate which causes no overflow or underflow of a buffer at the time of decoding and reproducing the moving picture data output from said padding means and setting said reproduction rate in the header of said moving picture data;

buffer control information setting means for producing buffer control information for assuring proper start of reproduction and proper random access and setting said moving picture data in each frame header of said moving picture data when reproducing said moving picture data output from said padding means.

* * * * *